(12) United States Patent
Buerkle et al.

(10) Patent No.: US 12,175,553 B2
(45) Date of Patent: Dec. 24, 2024

(54) AUTONOMOUS SYSTEM TERMINUS ASSISTANCE TECHNIQUES

(71) Applicant: Intel Corporation, Santa Clara, CA (US)

(72) Inventors: Cornelius Buerkle, Karlsruhe (DE); Kay-Ulrich Scholl, Malsch (DE); Fabian Oboril, Karlsruhe (DE); Frederik Pasch, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 17/124,804

(22) Filed: Dec. 17, 2020

(65) Prior Publication Data

US 2021/0103738 A1 Apr. 8, 2021

(51) Int. Cl.
| | | |
|---|---|---|
| *G06V 20/00* | (2022.01) | |
| *B60Q 1/24* | (2006.01) | |
| *G06Q 50/40* | (2024.01) | |
| *G06V 20/52* | (2022.01) | |
| *G06V 20/56* | (2022.01) | |
| *G06V 40/10* | (2022.01) | |
| *G08B 25/01* | (2006.01) | |
| *H04W 4/38* | (2018.01) | |
| *H04W 4/90* | (2018.01) | |

(52) U.S. Cl.
CPC ............. *G06Q 50/40* (2024.01); *B60Q 1/247* (2022.05); *G06V 20/52* (2022.01); *G06V 20/56* (2022.01); *G06V 40/10* (2022.01); *G08B 25/016* (2013.01); *H04W 4/38* (2018.02); *H04W 4/90* (2018.02); *B60Q 2400/40* (2013.01)

(58) Field of Classification Search
CPC ....... B60R 25/102; B60R 25/10; B60R 25/30; B60R 25/305; B60R 25/31; G06V 20/52; G06V 20/56; H04N 7/181
See application file for complete search history.

(56) References Cited

U.S. PATENT DOCUMENTS

| | | | |
|---|---|---|---|
| 9,809,196 B1* | 11/2017 | Penilla | ............ B60R 25/10 |
| 2010/0073201 A1* | 3/2010 | Holcomb | ......... H04M 3/42348 |
| | | | 455/457 |
| 2016/0193983 A1* | 7/2016 | Sawada | ............ B60R 25/102 |
| | | | 348/148 |
| 2020/0326704 A1* | 10/2020 | Blanco | ............. G05D 1/0257 |
| 2021/0225168 A1* | 7/2021 | Hoh | ................ G08G 1/012 |

* cited by examiner

*Primary Examiner* — Li Liu
(74) *Attorney, Agent, or Firm* — Schwegman Lundberg & Woessner, P.A.

(57) ABSTRACT

Various systems and methods for providing assistance at the end of an autonomous system journey are provided. A system can include an autonomous system configured to transport the user, a first sensor coupled to the autonomous system and configured to provide a sensor stream of an environment between the autonomous system and a terminus, and a terminus assistance processor mechanically coupled to the autonomous system. In an example, the terminus assistance processor can receive and process the sensor stream, detect and can track the user in the environment in response to the sensor stream, and can provide status information to a first mobile device based on the sensor stream.

14 Claims, 6 Drawing Sheets

AUTONOMOUS SYSTEM TERMINUS ASSISTANCE TECHNIQUES

TECHNICAL FIELD

Embodiments described herein generally relate to autonomous systems, and in particular, to terminus assistance techniques for a vehicle.

BACKGROUND

The proliferation of mobile communication devices has enabled users of such devices to retrieve and use information almost any time of day no matter where the user is located. Access to geographical and infrastructure information has almost made physical maps obsolete as users can use mobile applications that can retrieve such geographical and infrastructure information and can plan a route for a journey between two or more locations. Autonomous vehicles can further employ various machine learning functions to guide a vehicle along a designated route for the journey.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

A control system of a vehicle, for example in the form of a navigation system of a vehicle, can also provide services to a user before the user employs the vehicle for a journey from a first terminus (e.g., endpoint in a route traveled by the user), as well as, after the user completes the vehicle movement portion of the journey to a second terminus. A terminus assistance tool provided by the control system can help provide safe passage for the user between the respective terminus and the vehicle. In addition, the terminus assistance tool can monitor and record the passage of the user between the respective terminus and the vehicle for verification purposes after the fact. In certain examples, a second user can be designated as a supervisor and, in addition to monitoring the journey in real time, the supervisor can also monitor passage of the user between the vehicle and a corresponding terminus of the journey.

In certain examples, the terminus assistance techniques can be at least partially employed within an existing navigation system of a vehicle or in cooperation with a navigation application of a user's mobile device. The techniques can be applicable to a wide variety of vehicles and is described herein with reference to an autonomous vehicle. Other types of vehicle the example terminus assistance techniques may be employed with include, but not limited to, skateboards, scooters, bicycles, motorcycles, boats, aeronautic vehicles such as planes, helicopters, or similar propeller or jet powered aircraft, and all sorts of terrestrial passenger vehicles such as cars and trucks, as well as, autonomous versions of such vehicles.

Autonomous vehicles (AVs) are vehicles that can operate without human assistance. AVs may operate in a fully-autonomous mode or a partially-autonomous mode. When in a partially-autonomous mode, the AV may provide some autonomous functionality, such as lane departure monitoring, speed control, collision avoidance, or the like while the human operator performs other aspects of driving, such as steering. An example AV is provided in FIG. 1 and discussed further below.

AVs may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Figure 1:
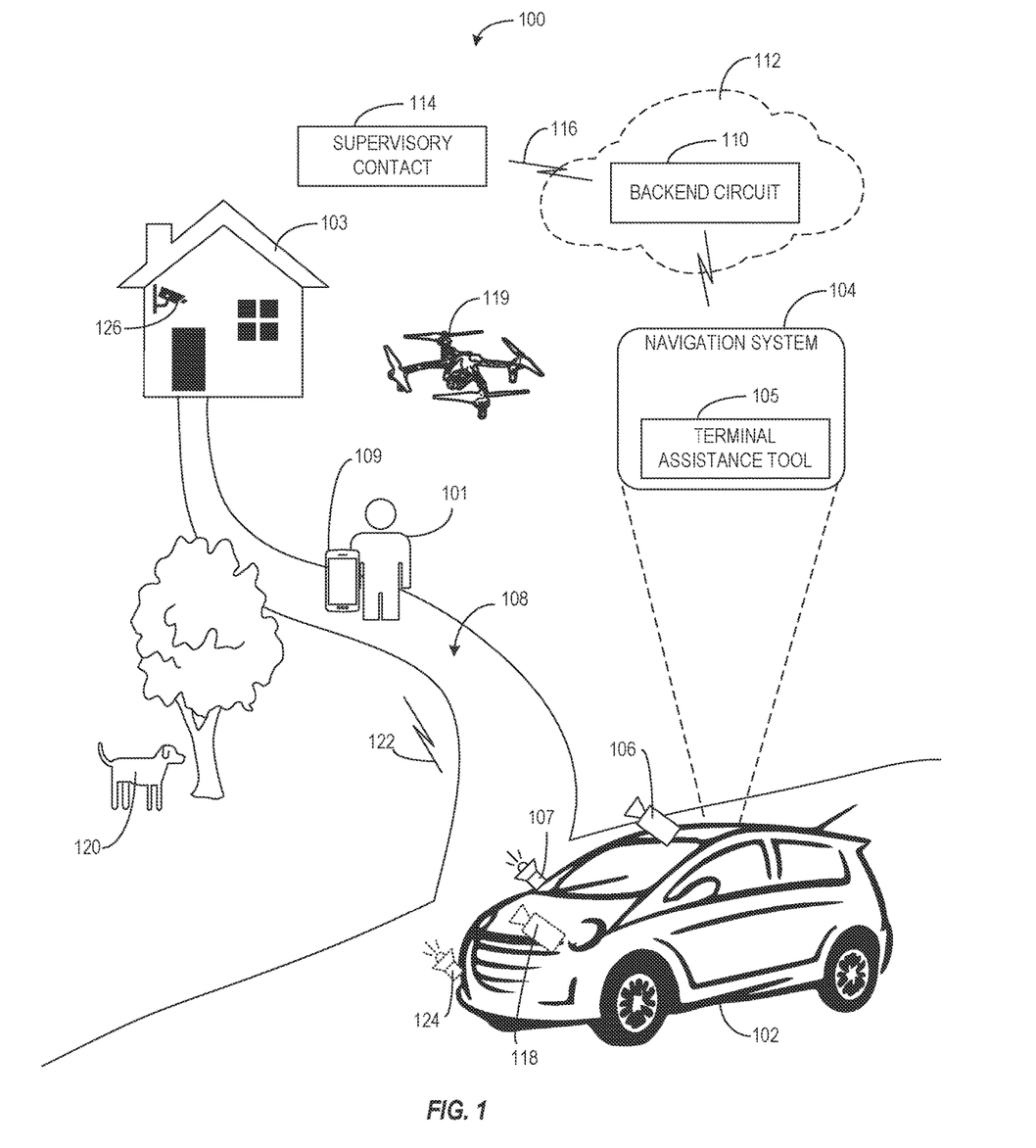
FIG. 1 illustrates an environment applicable to a control system of a vehicle employing an example terminus assistance tool.

FIG. 1 illustrates an environment 100 applicable to a navigation system 104 employing an example terminus assistance tool 105. The environment 100 includes a user 101, a vehicle 102 the user 101 has or will employ for transportation, a terminus 103 of the user's journey, and the navigation system 104 employing the terminus assistance tool 105. The vehicle 102 can include, for example, as part of the navigation system 104 or as part of the terminus assistance tool 105, one or more processors, terminus assistance processors, and a number of sensors or transducers 106, 107 to assist with providing terminus assistance to the user 101. Such sensors and transducers can include a camera 106 and an illumination source 107. The camera 106 can capture and record the scene including a pathway 108 between the vehicle 102 and the terminus 103. As the user 101 traverses between the terminus 103 and the vehicle 102, the terminus assistance tool 105 can track the user 101 and monitor the scene for movement or objects that may or may not pose a potential threat to the user's physical well-being. If the pathway 108 is dark, the illumination source 107 can be used to illuminate the pathway 108.

In certain examples, the user 101 may employ a software application on a personal mobile communication device 109 to interact with the terminus assistance tool 105. As the user 101 traverses between the vehicle 102 and the terminus 103, the terminus assistance tool 105 can establish a user communication link 122 with the user's personal communication device 109 and can broadcast image information of the camera 106 for viewing by the user 101. The visual feedback information provided by the image information can allow the user 101 to observe the environment 100 more fully about the pathway 108 in addition to the environment information available via the user's own view of the environment 100.

In certain examples, the navigation system 104 or the terminus assistance tool 105 can include a backend processor circuit 110. In some examples, the backend processor circuit 110 can be implemented within the circuits of the navigation system 104. In some examples, the backend processing circuit 110 can be separate from the navigation system 104. In some examples, the backend processing circuit 110 can be located remote from the vehicle 102. In some examples, the backend processing circuit 110 can optionally be employed in a cloud computing environment 112. The backend processing circuit 110 can receive the image information provided by the camera 106 and can store the information for use after the fact, for example, to verify that the user 101 traversed the pathway 108, or to assist in investigating an incident that may have occurred as the user 101 was traversing the pathway 108.

In certain examples, the user 101 can designate a supervisory contact 114 using the terminus assistance tool 105 and can provide supervisory contact information to the terminus assistance tool 105. Upon the user 101 invoking terminus assistance at the terminus 103, the backend processing circuit 110 can establish a supervisory communication link 116 using the supervisory contact information and can transmit the image data from the camera 106 to the supervisory communication link 116.

In certain examples, the terminus assistance tool 105 can employ additional sensors 118 or transducers that may be available on the vehicle 102. For example, if a vehicle 102 includes an additional sensor 118 such as an additional camera, or a lidar sensor, the terminus assistance tool 105 can use the additional sensor 118 scan the environment about the pathway 108 to detect other objects 120 or motion. In some examples, the vehicle can optionally deploy a drone 119 to provide an additional sensor such as a camera and to assist in tracking the user or a perceived threat. The data from the additional sensor(s) 118 can be processed using machine learning techniques to detect and classify potential objects 120 and motion and can then provide an alert to the user 101 via the user communication link 122. In some examples, the terminus assistance tool 105 can provide mapping images via the user communication link 122 such that a screen of the user's personal communication device 109 shows a map of the environment 100 about the vehicle 102 and terminus 103, and the locations of the user 101 and any other potentially relevant objects 120 detected by the terminus assistance tool 105. In some examples, an additional illumination source 124 of the vehicle 102 may be used to illuminate an area about a detected object 120 identified by the terminus assistance tool 105 such that the attention of the user 101 can be brought immediately to the area of the detected object 120. In certain examples, if the direction of the additional illumination source 124 can be manipulated by the terminus assistance tool 105, the terminus assistance tool 105 can track the detected object 120 with the additional illumination source 124.

In certain examples, in preparation for using the terminus assistance tool 105, a user 101 can provide connection information for using sensors and transducers 126 of the terminus 103 such as sensors and transducers 126 of a security system of the terminus 103. Upon the user 101 invoking terminus assistance, the terminus assistance tool 105 can detect that the vehicle 102 is at the terminus 103 and can establish communications with the security system for the purpose of using sensors or transducers 126 of the security system for providing terminus assistance to the user 101.

Figure 2:
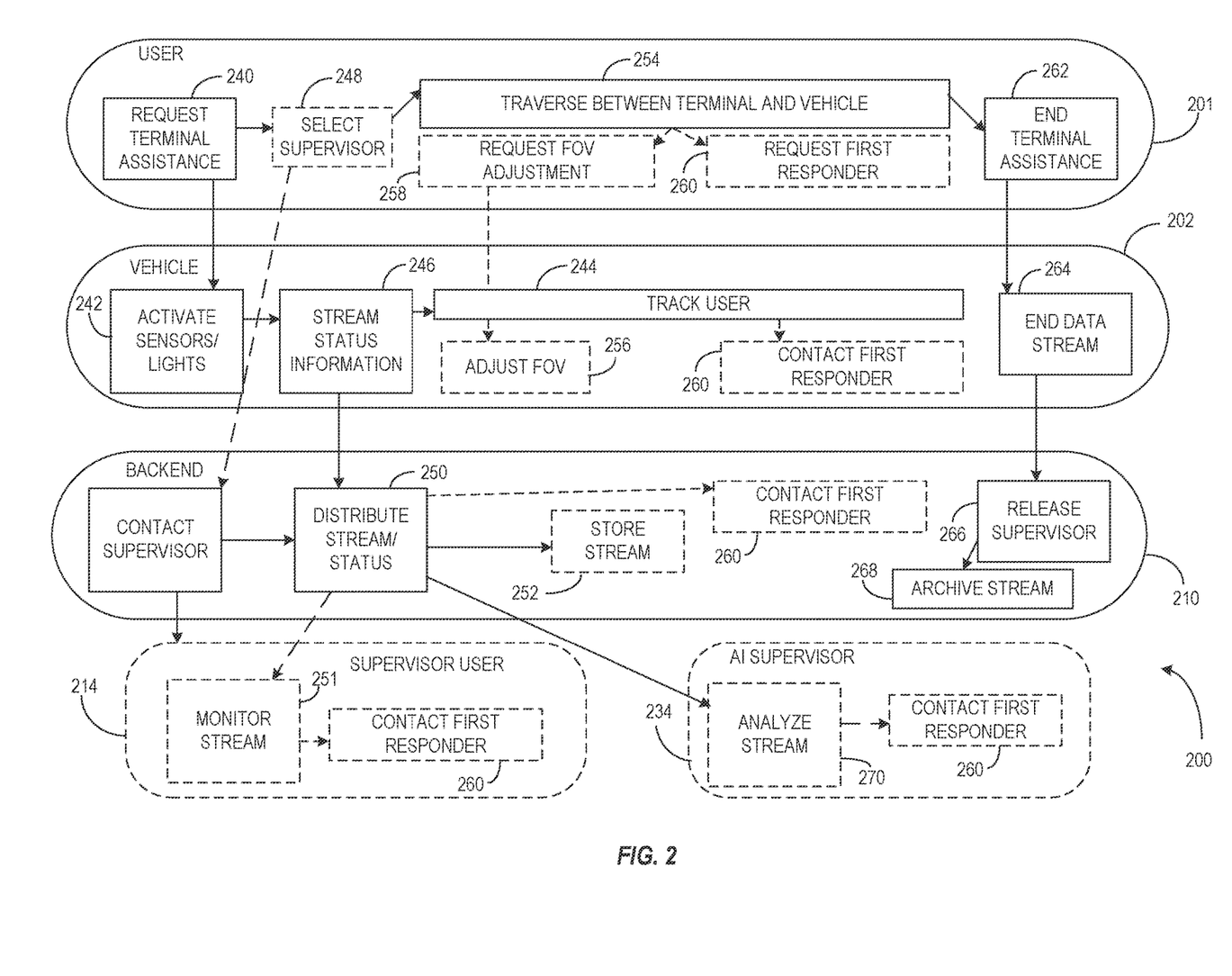
FIG. 2 illustrates generally an overview of the operation of a control system including an example terminus assistance capability within an environment.

FIG. 2 illustrates generally an overview of the operation of navigation system including an example terminus assistance capability within an environment 200. The environment 200 can include a vehicle 102 with a navigation system capable of providing terminus assistance, a first user 201 or more particularly, a computer device of a first user, a backend circuit 210 for either the navigation system or the terminus assistance capability, and one or more optional supervisor users 214, 234, or more particularly, computer devices of one or more optional supervisor users. Operation of the terminus assistance can be initiated or requested 240 by the first user 201 just prior to using the vehicle 202, near or at the time of arrival of the vehicle 202 to a destination of the first user 201, or while setting up a use of the vehicle 202. In certain examples, upon arriving at a destination, for example at an initial destination for picking up the first user 201, or a final destination for dropping off the first user 201, the terminus assistance can be initiated by the first user or automatically by a computer of a navigation system of the vehicle 202. Upon initialization, the vehicle 202 can execute several tasks including, but not limited to, establishing a first user communication link, establishing a terminus assistance communication link with the backend, etc. The vehicle can also initialize use of predetermined resources 242 to begin tracking 244 the first user 201 between the vehicle 202 and a terminus of the destination. Such resources can include tracking the user via a camera of the vehicle or another camera programmed within the terminus assistance circuit. The sensor stream or video feed of the cameras can be communicated or streamed 246 to the first user 201 to allow the user to potentially see more of the environment than visible from the first user's perspective. In some examples, if preprogrammed, or if selected 248 by the first user 201, the terminus assistance circuit can initialize a supervisory communication link to the optional second, supervisory users 214, 234 and the sensor stream can be distributed 250 to the second users for monitoring 251 or analysis 270. In certain examples, the backend circuit 210 can be part of the navigation system of the vehicle, can be part of the terminus assistance tool, or can be a cloud-based machine. In certain examples, one of the second supervisor users 214, 234 can be a supervisor user 214 selected by the first user 201, an employee of the navigation system provider, or an artificial intelligence (AI) system 234. In certain examples, the backend 210 can record signals 252 captured by one or more of the resources used to monitor the movement 254 of the first user 201 between the terminus and the vehicle 202. Such recording can be used for verification to another user that the first user 201 safely traversed 254 between the vehicle and the terminus or can be used to investigate an incident that may have occurred while the first user 201 was traversing 254 between the vehicle and the terminus.

As the first user traverses 254 between the terminus and the vehicle, the first user 201, or one or more of the second users 214, 234, field of view of the cameras or optionally the position of the vehicle can be adjusted 256, either automatically or in response to a request 258 from the first user 201. If the first user 201 encounters a situation while traversing 254 between the vehicle and the terminus any one of the first user 201, the backend circuit 210, or second users 214, 234 can initiate contacting assistance for the first user 201 such as a first responder, or someone else near the location of the first user.

Upon completion of the first user 201 traversing 254 between the terminus and the vehicle, the terminus assistance tool or the first user 201 can terminate 262 the terminus assistance. In response to terminating 262 the terminus assistance, the terminus assistance tool can terminate streaming 264 of any sensor signals and can terminate or release 266 the communication links between the terminus assistance tool and the first and second users 201, 214, 234. In certain examples, for example when the first user 201 uses terminus assistance at the beginning of a trip or journey, the first user communication link may be transferred or repurposed for use by the navigation system. In certain examples, upon termination 262 of the terminus assistance, the backend circuit 210 can archive 268 the information stream. In certain examples, archiving can include deleting the information stream, saving the information stream for a limited time, or saving the information stream to assist with investigating an incident happening during the terminus assistance.

In certain examples, when the terminus assistance tool is invoked when the area about the path between the terminus and the vehicle is dark, the terminus assistance tool can use an illumination source of the vehicle 202 or an illumination source of a connected terminus system to illuminate the path while the first user 201 traverses 254 the path. In some examples, if the focus direction of the illumination source can be controlled, the first user 201 or the supervisor user 214 can control the direction of the illumination source. In some examples, controlling the direction of the illumination source can include moving the vehicle 202 to control the direction of the illumination source.

A special benefit of the terminus navigation tool becomes apparent when something unexpected happens as the first user 201 traverses 254 the path between the vehicle and the terminus. For example, in certain examples, upon invoking 240 the terminus assistance capabilities of the terminus assistance tool, any one or more additional sensors of the vehicle or a connected resource (e.g., a security system of the terminus, etc.) can be enabled to scan or monitor the environment about the path between the terminus and the vehicle. The signals from the additional sensors, as well as the signal from the sensors tracking 244 the first user 201, can be processed on one or more levels to classify any detections. In some examples, a terminus assistance processor circuit of the vehicle 202 or the backend circuit 210 may be able to classify certain signal patterns as things (e.g., a tree, a fire hydrant, a curb, a bush, etc.). A more sophisticated processor of the vehicle 202, the backend circuit 210 or the A supervisor 234, may be able to analyze 270 the sensor information and classify detections with more granularity (e.g., a branch moving in the wind, a person walking a pet, a leaf blowing across a lawn, etc.) such that the more sophisticated processor or the AI supervisor 234 may also be able to classify such detections as potential or actual threats to the first user 201 and take action to alleviate the threat or bring the threat to the attention of the first user 201 or the supervisor user 214.

In certain examples, the terminus assistance tool can take action to bring the threat to the attention of the first user 201 or the supervisor user 214. For example, the terminus assistance tool can send a message to the electronic devices of the first user 201 or the supervisor user 214. In some examples, the message can take the form of augmenting the sensor stream either with a message about the threat or with an icon showing the location of the threat in relation to the first user 201. In certain examples, the terminus assistance tool can use one or more additional resources to affect the threat. For example, if an additional illumination source is available that can illuminate the area about the detected threat, the terminus assistance tool can enable that illumination source, so the first user's attention is drawn to the area of the detected threat. In some examples, other lights of the vehicle such as turn signals and tail lights can be flashed to draw attention the attention of the threat or to draw the attention of other people in the area to the vehicle and to the general vicinity of the threat. In some examples, the terminus assistance tool can use an audio transducer such as a speaker to alert the first user and to possibly alarm the threat by announcing the threat or generating other sounds (e.g., a siren, etc.) to deter the threat.

In certain examples, the terminus assistance tool either at the vehicle level, the backend level, or the AI supervisor level can detect an actual threat and can place a phone call, text message, or other signal to contact first responders 260 for assistance for the first user 201. In certain examples, the terminus assistance tool, for example, via an application running on the electronic device of the first user 201 or the supervisor user 214, can provide a panic button type user input device on the screen of the respective electronic device. If the first user 201 or the supervisor user 214 suspect an imminent threat to the first user 201 or some other imminent danger about the first user 201, terminus, or vehicle 202, the first user 201 or the supervisor user 214 can push or otherwise activate the panic button and the terminus assistance tool can contact 260 one or more first responders for assistance and can include the location of the first user 201, or the vehicle 202.

Figure 3:
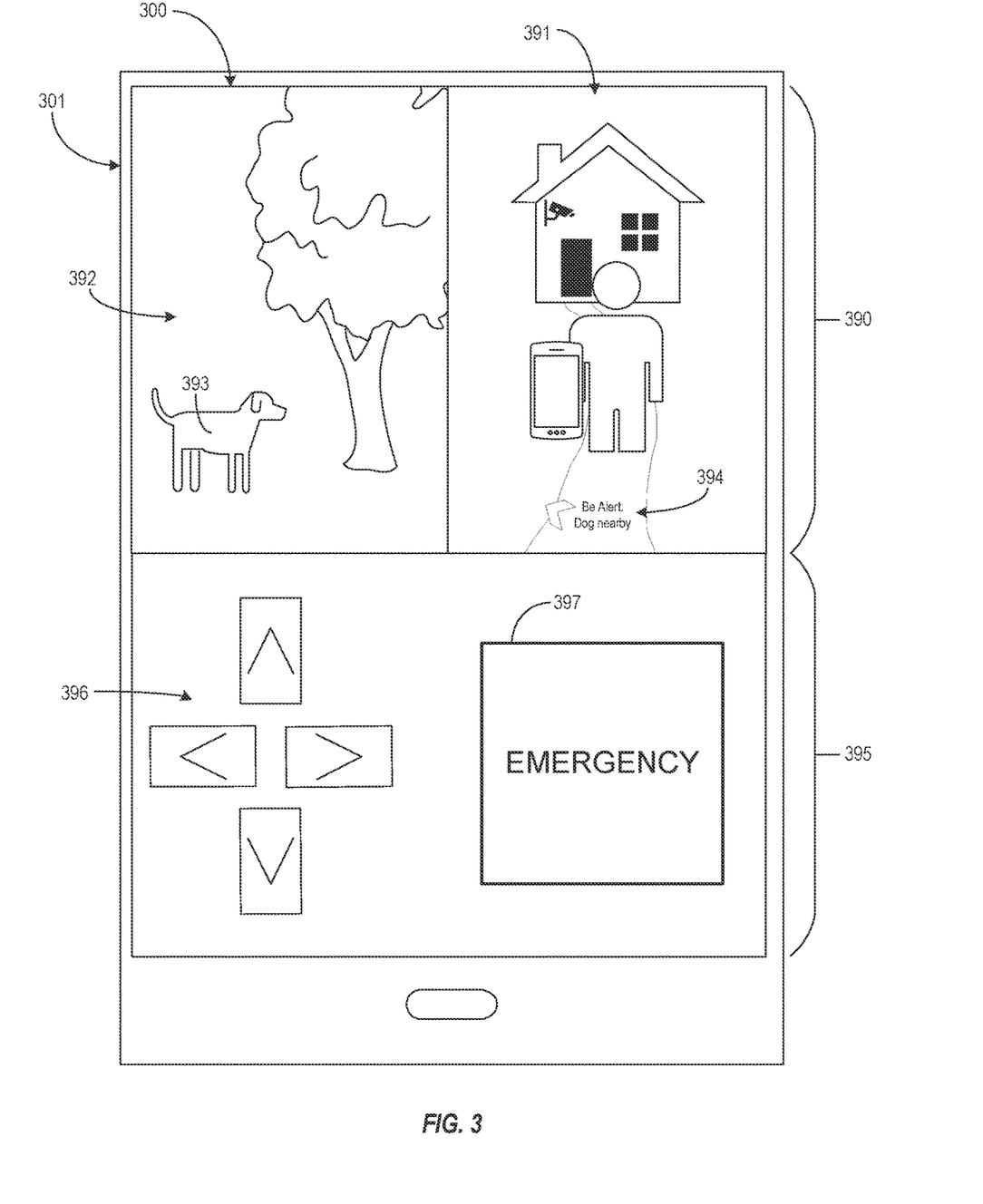
FIG. 3 illustrates generally an example screen display of an application accompanying the terminus assistance tool, or a screen display of the terminus assistance tool can initiate on a navigation application of an electronic device of the first user or the supervisor user.

FIG. 3 illustrates generally an example screen display 300 of an application accompanying the terminus assistance tool, or a screen display of the terminus assistance tool can initiate on a navigation application of an electronic device 301 of the first user or the supervisor user. The screen display 300 can include a first area 390 to view one or more video streams such as the video stream 391 tracking the first user. In some examples, the first area can include an overview map showing the location of the vehicle, the terminus and the first user as deleted by the terminus assistance tool. In some examples, if a second camera is available, a second video stream 392 can include a video stream of an area outside the field of view of the first camera tracking the first user so the first user can see more of the environment than what is available from the first user's perspective. In certain examples, if something is detected, a detection 393, by the terminus assistance tool, one or more of the video streams 391, 392 discussed above can be augmented with the location or descriptive text 394 of the detection 393 to bring the detection to the first user's or supervisory user's attention.

An optional second area 395 of the screen display 300 can include user inputs 396, 397. In certain examples, the second area 395 of the screen display 300 can include controls 396 for directing an illumination source controllable via the terminus assistance tool, or for directing or adjusting a field of view of a camera controllable via the terminus assistance tool. In certain examples, the second area 395 of the screen display 300 can include a panic button 397 for initiating the terminus assistance tool to contact first responders. The second area 395 can also selectively display user inputs to initiate the capabilities of the terminus assistance tool or to release the capabilities of the terminus assistance tool, for example, when the first user has completed traversing the path between the terminus and the vehicle.

Figure 4:
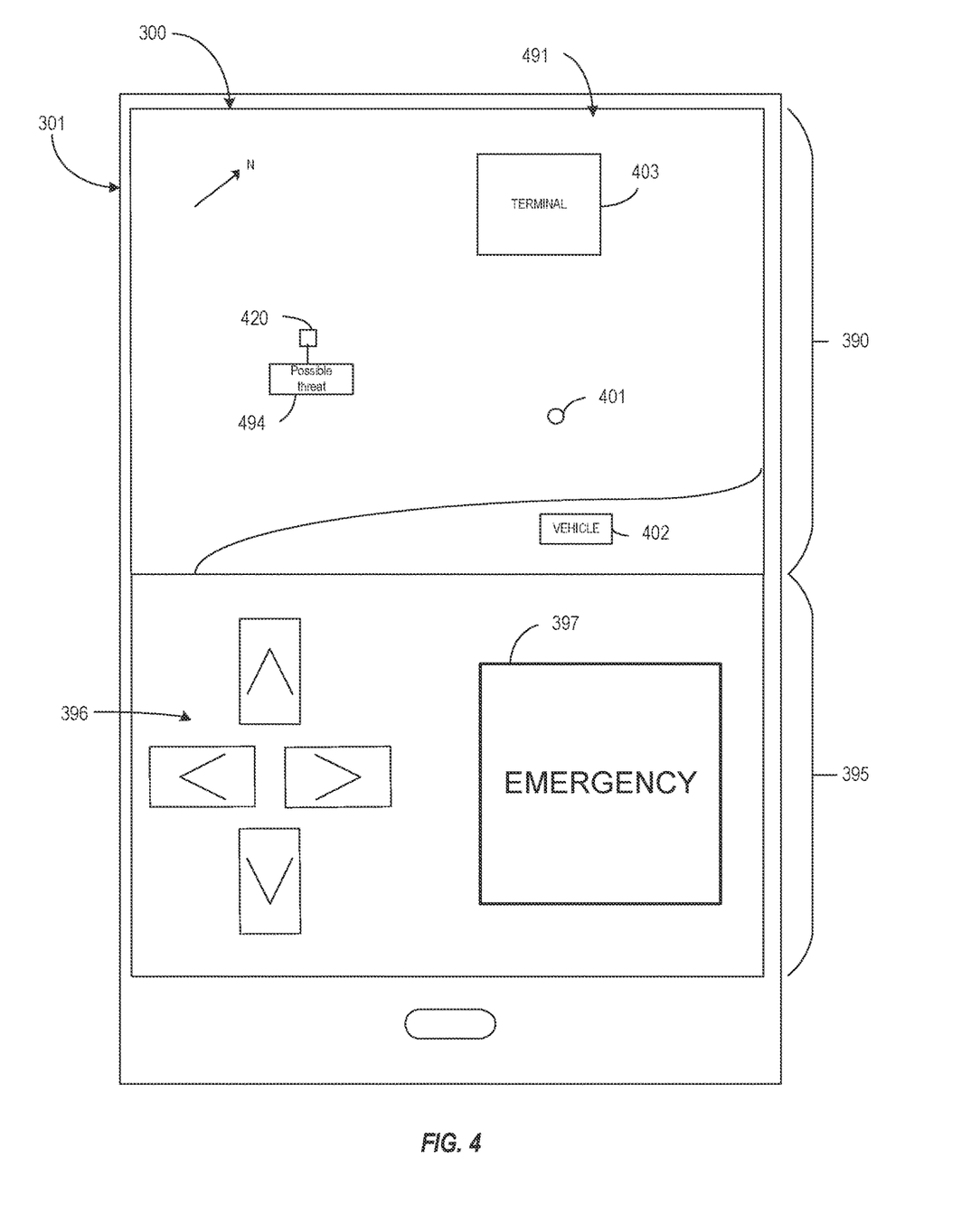
FIG. 4 illustrates generally an alternative example map display for the first area that can be used with or instead of the displays of FIG. 3.

FIG. 4 illustrates generally an alternative example map display 491 for the first area 390 that can be used with or instead of the displays 391, 392 of FIG. 3. Instead of displaying only image information, the first area 390 can also be used to display a map 491 of the environment about the vehicle 402 and the terminus 403. The map 491 can be augmented with icons of the user 401, the terminus 403, the vehicle 402, and other objects 420 detected by the terminus assistance tool. In certain examples, the terminus assistance tool can use text 494 to augment the map display 491 to indicate what an object is and whether the object appears to be a threat. In some examples, colors can be used to denote whether a detected object has been classified and whether that classification indicates the object is or is not a threat, and possibly, the level of threat the object represents.

Figure 5:
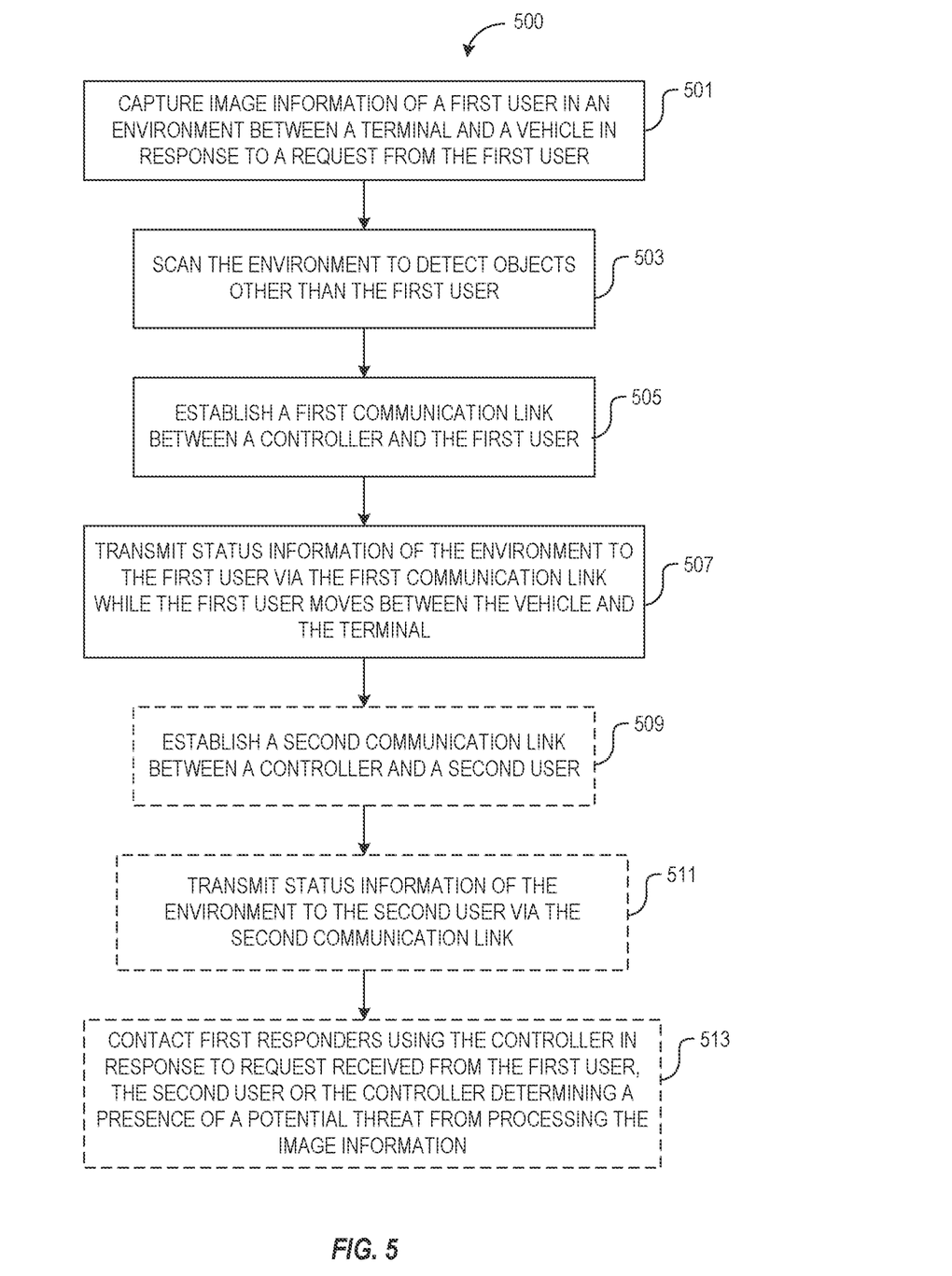
FIG. 5 illustrates generally flowchart of an example method of operation of an example terminal assistance tool according to the present subject matter.

FIG. 5 illustrates generally flowchart of an example method of operation of an example terminus assistance tool according to the present subject matter. The operations of the method 500 are performed by computer hardware, such as that described above with respect to FIGS. 1-4, or below with respect to FIG. 6. At 501, after receiving a request from a first user, the terminus assistance tool can capture image information from an environment a second user can use to traverse between a terminus and a vehicle. In some examples, as illustrated for this example, the first and second user are the same. When a parent makes the request for child beginning or ending an autonomous vehicle journey alone is an example when the first and second user can be different users. In certain examples, the image information can include a video stream using a first camera of the vehicle or a second camera of a resource previously programmed into the terminus assistance tool.

At 503, the camera or one or more additional sensor can scan the environment for objects other than the first user. In certain examples, the terminus assistance terminus can use the image information to detect and classify objects within the environment. In some examples, additional sensors of the vehicle or of a previously programmed resource can be used to scan the environment outside the field of view of the first camera for objects other than the first user.

At 505, a first communication link can be established between a controller of the terminus assistance tool and the first user, or more accurately, an electronic device of the first user. At 507, status information of the environment can be transmitted to the first user as the first user traverses, or moves, between the terminus and the vehicle. The status information can include one or more sensor streams, video streams, or other image information, to allow the first user to be more completely aware of the environment about the path between the vehicle and the terminus. In certain examples, the status information can include textual or graphical indications of other objects detected in the environment.

At 509, a second commination link can be optionally established with a second user, or an electronic device of the second user. Such a second user can be a supervisory user as discussed above. In certain examples, contact information for the second user can be preprogrammed in the terminus assistance tool or can be provided by the first user upon requesting terminus assistance. At 511, status information of the environment of the first user can be transmitted to the second user as the first user traverses, or moves, between the terminus and the vehicle. The status information can include one or more video streams, or other image information, to allow the second user to be aware of the well-being of the first user and to be aware of the environment about the path of the first user between the vehicle and the terminus. In certain examples, the status information can include textual or graphical indications of other objects detected in the environment.

At 513, if a threat is detected by the first user, the second user, or the terminus assistance tool, such as by processing the image information, a controller of the terminus assistance tool can contact first responders for physical assistance. In certain examples, the first or second users can use a user input on their respective electronic device, such as a panic button provided on a display of an application associated with the terminus assistance tool. In certain examples, the terminus assistance tool can record status information for subsequent use. For example, stored recordings can be used to by a parent to verify a first user, such as a child or other loved one, safely traversed between the vehicle and the terminus. In another example, stored recordings can be used to assist with investigating an incident that happened within the environment while a first user traversed between the vehicle and the terminus.

A terminus assistance tool according to the present subject matter, whether working in conjunction with a navigation system or an autonomous vehicle system, can extend the usefulness of such systems. The terminus assistance tool can also provide peace of mind to users as well as to others associated with the users by providing a means to more completely monitor a journey of the user from the moment the user leaves the door of a first terminus to the moment the user enters the door of a destination terminus and even the moments the user traverses between intermediate terminuses such as traversing between vehicles during the journey or using an intermediate terminus for a break during the journey.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
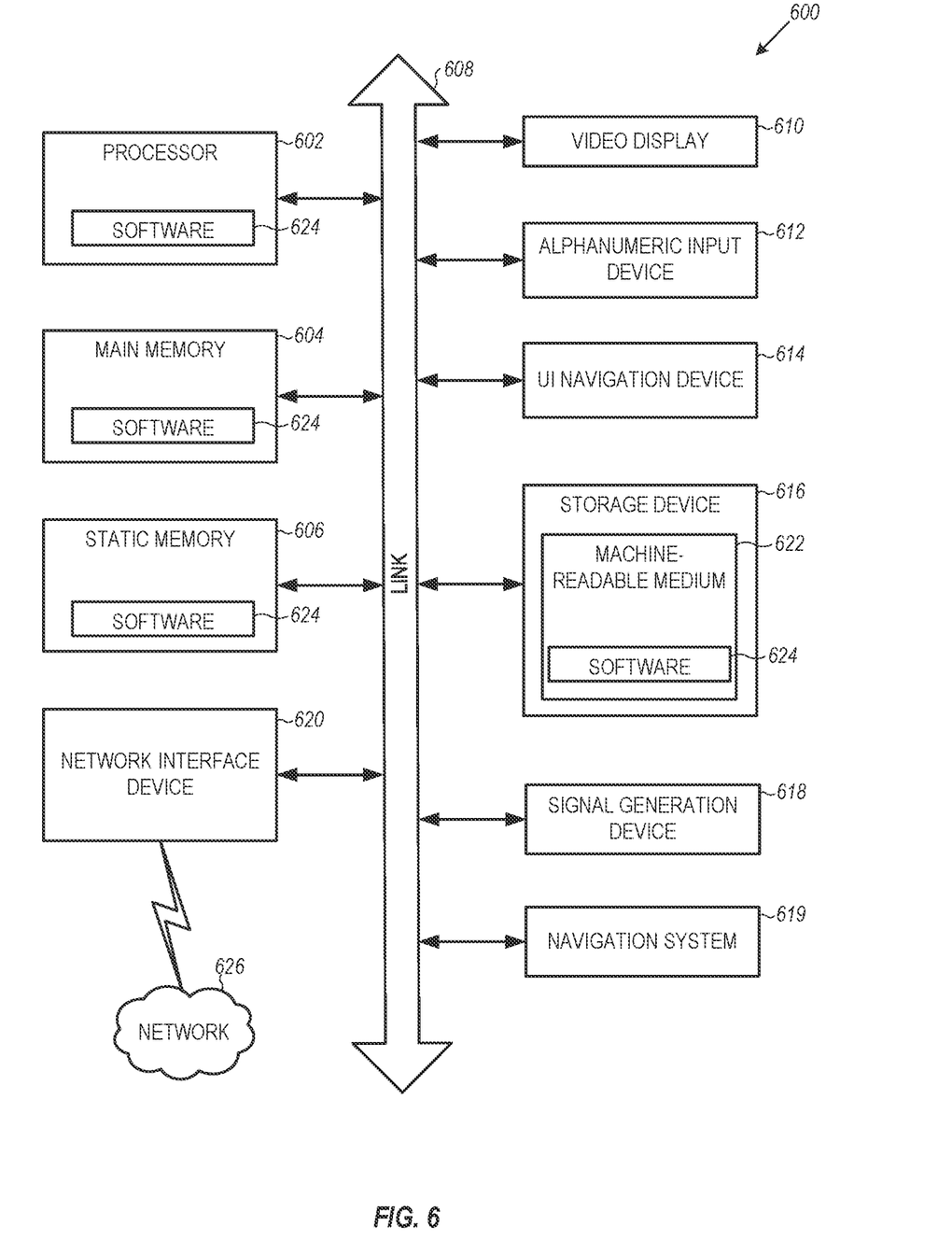
FIG. 6 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 60 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor. In an example embodiment, the computer system 600 may further include a navigation system 619, which may have functionalities similar to the navigation system 104 described in reference to FIG. 1, as well as other places in the present document.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for monitoring a user at a terminus of a journey, the system comprising: a vehicle configured to transport the user; a first sensor coupled to the vehicle and configured to provide a sensor stream of an environment between the vehicle and a terminus; and a terminus assistance processor mechanically coupled to the vehicle, the terminus assistance processor configured to receive and process the sensor stream, to detect and track the user in the environment in response to the sensor stream, and to provide status information to a first mobile device based on the sensor stream.

In Example 2, the subject matter of Example 1 includes, wherein the vehicle is an autonomous vehicle.

In Example 3, the subject matter of Examples 1-2 includes, a first illumination source, wherein the terminus assistance processor is configured to illuminate the environment with light from the first illumination source.

In Example 4, the subject matter of Example 3 includes, wherein the first illumination source is mechanically coupled to the vehicle.

In Example 5, the subject matter of Examples 3-4 includes, wherein the first illumination source is mechanically coupled to the terminus.

In Example 6, the subject matter of Examples 1-5 includes, a second sensor configured to scan outside the environment.

In Example 7, the subject matter of Example 6 includes, wherein the terminus assistance processor is configured to receive a status signal from the second sensor, to process the second sensor status signal to determine potential threats to the user, and to provide an alarm to the first mobile device in response to determining a potential threat from the second sensor status signal.

In Example 8, the subject matter of Example 7 includes, a second illumination source, wherein the terminus assistance processor is configured to illuminate the potential threat using light from the second illumination source.

In Example 9, the subject matter of Examples 7-8 includes, wherein the terminus assistance processor is configured to contact first responders in response to determining the potential threat from the second sensor status signal.

In Example 10, the subject matter of Examples 1-9 includes, wherein the terminus assistance processor is configured to distribute the sensor stream to a cloud-based computer system.

In Example 11, the subject matter of Example 10 includes, wherein the terminus assistance processor is configured to establish communication with a second mobile device and to route the sensor stream to the second mobile device in response to the request from the first mobile device.

Example 12 is a method for providing assistance to a first user at a terminus of a vehicle journey, the method comprising: capturing first information of movement of the first user in an environment between the vehicle and the terminus in response to a request from the first user; scanning the environment to detect objects other than the first user; establishing a first communication link between a controller and the first user in response to the request from the user; and transmitting status information of the environment to the first user via the first communication link while the first user moves between the terminus and the vehicle.

In Example 13, the subject matter of Example 12 includes, illuminating at least a portion of a path between the vehicle and the terminus.

In Example 14, the subject matter of Examples 12-13 includes, detecting an object other than the user within the environment, identifying the object can move, and illuminating the object for viewing by the user.

In Example 15, the subject matter of Examples 12-14 includes, receiving a supervisor contact request at the controller from the first user via the first communication link; and contacting first responders via the controller in response to the supervisor contact request.

In Example 16, the subject matter of Examples 12-15 includes, wherein the terminus is a location where the user ends the vehicle journey.

In Example 17, the subject matter of Examples 12-16 includes, wherein the terminus is a location where the user begins the vehicle journey.

In Example 18, the subject matter of Examples 12-17 includes, wherein capturing first information includes tracking the movement of the first user in the environment between the vehicle and the terminus.

In Example 19, the subject matter of Examples 12-18 includes, wherein the vehicle is an autonomous vehicle.

Example 20 is at least one non-transitory, machine-readable medium including instructions for providing terminus assistance to a first user from a vehicle, the instructions when executed by a machine, cause the machine to perform operations comprising: capturing first information of movement of the first user in an environment between the vehicle and a terminus in response to a request from the first user received at a controller of the vehicle; scanning the environment to detect objects other than the first user; establishing a first communication link between the controller and the first user in response to the request from the user; and transmitting the status information to the user while the user is moving between the terminus and the vehicle.

In Example 21, the subject matter of Example 20 includes, wherein the operations include illuminating at least a portion of a path between the vehicle and the terminus.

In Example 22, the subject matter of Examples 20-21 includes, wherein the operations include detecting a first object other than the first user within the environment, determining the object can move, and illuminating the object for viewing by the first user.

In Example 23, the subject matter of Examples 20-22 includes, wherein the operations include: receiving an emergency contact request at the controller from the first user via the first communication link; and contacting first responders via the controller in response to the emergency contact request.

In Example 24, the subject matter of Examples 20-23 includes, wherein the operation of capturing image information includes tracking the movement of the first user in the environment between the vehicle and the terminus.

In Example 25, the subject matter of Examples 20-24 includes, wherein the operations include establishing communication with a second mobile device and routing the status information to the second mobile device in response to the request from the first user.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing assistance to a first user at a terminus, the method comprising:
    receiving connection information from the first user for connecting to a first sensor at the terminus, wherein the terminus is a starting point or an ending point in a route traveled by the first user;
    connecting to the first sensor at the terminus using the connection information;
    capturing, using the first sensor at the terminus, a first information of movement of the first user in an environment between an autonomous transport system and the terminus in response to a request from the first user;
    receiving a second information of movement of the first user in the environment, the second information of movement captured using a second sensor at the autonomous transport system;
    establishing a first communication link between a controller and the first user in response to the request from the first user; and
    transmitting the first information of movement and the second information of movement in the environment to the first user via the first communication link while the first user moves between the terminus and the autonomous transport system.

2. The method of claim 1, including illuminating at least a portion of a path between the autonomous transport system and the terminus.

3. The method of claim 1, further comprising:
    monitoring the environment, using the first sensor, to detect objects other than the first user;
    receiving monitoring data from the second sensor;
    detecting, using the monitoring data from the first sensor and the received monitoring data from the second sensor, an object other than the first user within the environment;
    identifying the object can move; and
    illuminating the object for viewing by the first user.

4. The method of claim 1, further comprising: receiving a supervisor contact request at the controller from the first user via the first communication link; and
    contacting first responders via the controller in response to the supervisor contact request.

5. The method of claim 1, wherein the terminus is a location where the first user ends a journey.

6. The method of claim 1, wherein the terminus is a location where the first user begins a journey.

7. The method of claim 1, wherein capturing first information includes tracking the movement of the first user in the environment between the autonomous transport system and the terminus.

8. The method of claim 1, wherein the autonomous transport system is an autonomous vehicle.

9. At least one non-transitory, machine-readable medium including instructions for providing terminus assistance to a first user from an autonomous transport system, the instructions when executed by a machine, cause the machine to perform operations comprising:
receiving connection information from the first user for connecting to a first sensor at a terminus, wherein the terminus is a starting point or an ending point in a route traveled by the first user;
connecting to the first sensor at the terminus using the connection information;
capturing, using the first sensor at the terminus, a first information of movement of the first user in an environment between the autonomous transport system and the terminus in response to a request from the first user received at a controller of the autonomous transport system;
receiving a second information of movement of the first user in the environment, the second information of movement captured using a second sensor at the autonomous transport system;
establishing a first communication link between the controller and the first user in response to the request from the first user; and
transmitting the first information of movement and the second information of movement in the environment to the first user while the first user is moving between the terminus and the autonomous transport system.

10. The at least one non-transitory, machine-readable medium of claim 9, wherein the operations include illuminating at least a portion of a path between the autonomous transport system and the terminus.

11. The at least one non-transitory, machine-readable medium of claim 9, wherein the operations include scanning the environment to detect objects other than the first user, detecting a first object other than the first user within the environment, determining the first object can move, and illuminating the first object for viewing by the first user.

12. The at least one non-transitory, machine-readable medium of claim 9, wherein the operations include:
receiving an emergency contact request at the controller from the first user via the first communication link; and
contacting first responders via the controller in response to the emergency contact request.

13. The at least one non-transitory, machine-readable medium of claim 9, wherein the operation of capturing the first information includes capturing image information and tracking the movement of the first user in the environment between the autonomous transport system and the terminus.

14. The at least one non-transitory, machine-readable medium of claim 9, wherein the operations include establishing communication with a second mobile device and routing the first information to the second mobile device in response to the request from the first user.

* * * * *